(12) United States Patent
Metzger et al.

(10) Patent No.: US 12,541,186 B2
(45) Date of Patent: Feb. 3, 2026

(54) METHOD FOR OPERATING A POWER SUPPLY NETWORK, COMPUTER PROGRAM AND ELECTRONICALLY READABLE DATA CARRIER

(71) Applicant: Siemens Aktiengesellschaft, Munich (DE)

(72) Inventors: Michael Metzger, Markt Schwaben (DE); Nikolai Demydov, Feucht (DE); Eva Wagner, Erlangen (DE); Mathias Duckheim, Erlangen (DE); Paul Stursberg, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 363 days.

(21) Appl. No.: 18/322,124

(22) Filed: May 23, 2023

(65) Prior Publication Data

US 2023/0384747 A1 Nov. 30, 2023

(30) Foreign Application Priority Data

May 25, 2022 (EP) ..................................... 22175423

(51) Int. Cl.
*G05B 19/042* (2006.01)
*G06N 20/00* (2019.01)
(52) U.S. Cl.
CPC ............ *G05B 19/042* (2013.01); *G06N 20/00* (2019.01); *G05B 2219/2639* (2013.01)
(58) Field of Classification Search
CPC .......... G05B 19/042; G05B 2219/2639; G06N 20/00; H02J 3/00; H02J 2203/10; H02J 2203/20; H02J 13/00002
See application file for complete search history.

(56) References Cited

U.S. PATENT DOCUMENTS

2012/0022713 A1* 1/2012 Deaver, Sr. ............ G05B 17/02
  700/298
2018/0247001 A1* 8/2018 Liu ........................ G06F 16/955
(Continued)

OTHER PUBLICATIONS

Abdulrahman, I., Radman, G. Power system spatial analysis and visualization using geographic information system (GIS). Spat. Inf. Res. 28, 101-112 (2020) (Year: 2020).*

(Continued)

*Primary Examiner* — Christopher E. Everett
(74) *Attorney, Agent, or Firm* — Slayden Grubert Beard PLLC

(57) ABSTRACT

The teachings herein include methods for operating a low- or medium-voltage power supply network including lines and a plurality of systems connected thereto. The method may include: providing GIS data with geographic location information relating to the power supply network; producing a branch model of the lines on the basis of the GIS data, including determining a starting probability for connections; providing system data characterizing at least one system; producing a prior model of the network by combining the branch model with the system data, including determining a starting probability for the system; generating an input state describing a possible state of the power supply network described by the prior model; carrying out a load flow simulation calculating a state variable on the basis of the input state; determining a state model of the power supply network on the basis of the state variable; and operating the power supply network based on the state model.

13 Claims, 1 Drawing Sheet

(56) References Cited

U.S. PATENT DOCUMENTS

2020/0409323 A1* 12/2020 Spalt ................. G05B 13/0265
2021/0117586 A1*  4/2021 Wu .................... G05B 19/042

OTHER PUBLICATIONS

Radhakrishnan, Krishnanand Kaippilly, et al. "GIS integrated automation of a near real-time power-flow service for electrical grids." IEEE Transactions on Industry Applications 54.6 (2018): 5661-5670 (Year: 2018).*

Hassan, H. T., and M. Faheem Akhtar. "Mapping of Power Distribution Network using Geographical Information System (GIS)." International Journal of Emerging Technology and Advanced Engineering 2.6 (2012): 343-347 (Year: 2012).*

Suryawati, Indri, and Ontoseno Penangsang. "Online power flow management based on GIS for active distribution network management." 2017 International Conference on High Voltage Engineering and Power Systems (ICHVEPS). IEEE, 2017 (Year: 2017).*

Lazarou, S., et al. "A power system simulation platform for planning and evaluating distributed generation systems based on GIS." Energy Systems 4.4 (2013): 379-391 (Year: 2013).*

J. E. King, S. C. E. Jupe and P. C. Taylor, "Network State-Based Algorithm Selection for Power Flow Management Using Machine Learning," in IEEE Transactions on Power Systems, vol. 30, No. 5, pp. 2657-2664, Sep. 2015 (Year: 2015).*

Search Report for EP Application No. 22175423.7, 12 pages.

Schweppe, Fred C. et al; "Power system static state estimation, Part I, II, III", IEEE Transaction on Power Apparatus and Systems, vol. PAS-89, No. 1, pp. 120-135.

Onwuachumba, Amamihe et al: "Reduced Model for Power System State Estimation Using Artificial Neural Networks", IEEE Green Technologies Conference, pp. 407-413, XP032440319, ISSN: 2166-546X, Doi: 10.1109/GREENTECH.2013.69 Isbn: 978-1-4673-5191-1.

Medeiros, Thiago S et al: "Optimized voltage and reactive power control in the context of advanced distribution automation", 2020 IEEE PES Transmission & Distribution Conference and Exhibition—Latin America (T&D LA), IEEE, pp. 1-6, XP033882066, DOI: 10.1109/TDLA47668.2020.9326160.

* cited by examiner

METHOD FOR OPERATING A POWER SUPPLY NETWORK, COMPUTER PROGRAM AND ELECTRONICALLY READABLE DATA CARRIER

CROSS-REFERENCE TO RELATED APPLICATIONS

This application claims priority to EP Application No. 22175423.7 filed May 25, 2022, the contents of which are hereby incorporated by reference in their entirety.

TECHNICAL FIELD

The present disclosure relates to power supply networks. Various embodiments of the teachings herein include methods for operating a power supply network, computer programs, and/or electronically readable data carriers.

BACKGROUND

Low-voltage power supply networks, which in particular represent network sections of the last mile to end consumers, are increasingly incorporating new systems, for example photovoltaic systems, storage systems, for example electric batteries, and/or consumers, for example charging stations for electric vehicles. Due to the resulting change in the generation scenarios and consumption scenarios, low-voltage networks such as these are accordingly loaded differently and, in particular, additionally.

As a rule, hardly any metering infrastructure is installed in low-voltage networks, especially in contrast to transmission networks. On the one hand, this means that only imprecise estimates of the state of the low-voltage network can be determined; on the other hand, it is usually only relevant to a low-voltage network whether a limit value violation is close or probable. In this regard, not only are deterministic values necessary for estimating the state, but information on how reliable these estimates are would also be helpful. This means, for example, information on the uncertainty of the estimated values.

Typical network state estimation in electricity distribution networks uses the "Weighted Least Squares" method, which takes into account the accuracies of the available measured values using weights in a quadratic objective function that needs to be minimized. The estimated network state is a deterministic vector of state variables. See F. C. Schweppe and J. Wildes, "Power System Static-State Estimation, Parts I, II and III", in IEEE Transactions on Power Apparatus and Systems, January 1970. Furthermore, there are methods for state estimation that use feedforward neural networks. These train the weights of the artificial neural networks by using historical or simulated training data, wherein the resulting weights are also deterministic values.

SUMMARY

The teachings of the present disclosure provide methods, computer programs, and/or data carriers which can be used to carry out a state estimation for the operation of a low-voltage and/or medium-voltage power supply network, which state estimation describes a state model whose weights can be defined in a particularly advantageous manner. For example, some embodiments include a method for operating a low-voltage and/or medium-voltage power supply network which comprises lines (16) and a plurality of systems (18) connected thereto, wherein a state of the power supply network is determined by: providing GIS data (10), which comprise geographic location information relating to the power supply network, from a geographic information system; (S1) producing a branch model (12) of the lines on the basis of the GIS data, wherein a starting probability for connections is determined; (S2) providing system data which characterize at least one of the plurality of systems (18); (S3) producing a prior model of the power supply network by combining the branch model (12) with the system data, wherein a starting probability for the at least one system (18) is determined; (S4) generating an input state which describes a possible state of the power supply network described by the prior model; (S5) carrying out a load flow simulation which calculates at least one state variable on the basis of the input state; (S6) and determining a state model of the power supply network on the basis of the at least one state variable. (S7)

In some embodiments, the state model is used to carry out a control intervention on one of the plurality of systems (18).

In some embodiments, the state model is produced by machine learning, wherein the at least one state variable obtained by the load flow simulation is used as training data and in particular a Bayesian neural network is used.

In some embodiments, the state model is refined by repeating the load flow simulations until a specified quality criterion is met as a termination condition.

In some embodiments, the system data are provided by a smart meter and/or a field device and/or an active element.

In some embodiments, real-time data are supplied to the state model and/or the system data comprise real-time data and/or near-real-time data.

In some embodiments, the state model is re-trained, wherein measurements are used as the input state and/or the state variable.

In some embodiments, a correlation between the control intervention and changes of state is detected.

In some embodiments, during the load simulation a target variable is determined from an input variable, which together are used as a training pair for the state model.

In some embodiments, the input state and/or the state variable and/or the state comprise a voltage and/or a current and/or a voltage band and/or a power.

In some embodiments, one of the plurality of systems is in the form of a consumer device and/or a generator device and/or a feeder and/or a local network station and/or a circuit breaker.

In some embodiments, a sample is prepared and/or a modelled, a posteriori probability distribution relating to the state is produced.

As another example, some embodiments include a computer program which can be loaded directly into a memory of an electronic computing device, comprising program means for performing one or more of the methods as described herein when the program is executed in the electronic computing device.

As another example, some embodiments include an electronically readable data carrier having electronically readable control information stored thereon, which comprises at least one computer program as described herein configured to perform one or more of the methods described herein when the data carrier is used in an electronic computing device.

DETAILED DESCRIPTION

Figure 1:
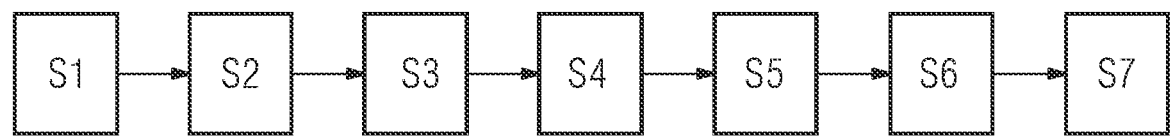
FIG. 1 shows a schematic flow diagram of a method for operating a power supply network incorporating teachings of the present disclosure.

Some embodiments of the teachings herein include a method for operating a low-voltage and/or medium-voltage power supply network which comprises lines and a plurality of systems connected thereto. In one example method incorporating teachings of the present disclosure, a state of the power supply network is determined as follows:

In a first step, GIS data are provided, which comprise geographical location information, i.e. information on the location, relating to the power supply network, wherein the GIS data originate from, or are provided by, a geographic information system.

In a second step, a branch model of the lines of the power supply network is produced on the basis of the GIS data, wherein a starting probability for connections between the lines is determined. The branch model thus represents a line topology of the power supply network.

In a third step, system data are provided which characterize at least one of the plurality of systems.

In a fourth step, a prior model of the power supply network is produced by combining the branch model with the system data, wherein a starting probability for the at least one system is determined.

In a fifth step, an, in particular random, input state is generated which describes a possible state of the power supply network described by the prior model.

In a sixth step, a load flow simulation is carried out which calculates at least one state variable on the basis of the input state.

In a seventh step, a state model of the power supply network is determined on the basis of the at least one state variable.

In some embodiments, the power supply network is a low-voltage network and thus designed for distributing electrical energy to electrical end consumers. An end consumer is, for example, a household with low-voltage appliances. These can provide part of the systems. Due to line losses, the spatial extent of the low-voltage network is usually limited to a range of a few 100 meters to a few kilometers. The low-voltage network can, for example, be supplied with energy from a superordinate medium-voltage network via a transformer station. In some embodiments, the power supply network can also be in the form of the medium-voltage network.

The geographic information system (GIS for short) is an information system for collecting spatial data, wherein these can be analyzed and organized. For example, the GIS data can be formed from aerial images analyzed by machine vision. Such an aerial image may include as location information, for example, the position of end consumers, such as houses or households, and/or the position of electricity pylons for lines connected thereto. The lines of the power supply network are in the form of electrical lines. The systems can, for example, be energy consumers or energy generators, such as photovoltaic systems.

In other words, the method described uses data from the GIS system to create a "skeleton"-like model of the electronic network. This model is a branch model of the lines, for which in particular connections between end points and geographically close starting points are modelled using topology states having certain probabilities. The probabilities, or the starting probability, can be chosen to be evenly distributed, for example, without additional prior knowledge.

For the connected systems, characteristic data are used to create a further probability distribution, which describes, for example, possible load and feed states of the systems with respective specific uncertainties. If measurement data are available, these probability distributions, or the starting probability, can also be obtained therefrom.

All in all, a parameterization of a prior distribution, which is represented by the branch model and the system data, now effectively results in the prior model.

To carry out the load flow simulation, samples can now be taken, or determined, according to the prior, parameterized assumed probability distributions, the starting probability or starting distributions. These samples can characterize the input state, which is generated in particular at random, and describe, for example, a set of topology states, loads and/or feeds relating to the power supply network.

In the load flow simulation, a state of the power supply network, or the state variable, is thus calculated, which can, for example, describe a voltage, a current and/or a power flow relating to the power supply network. The load flow simulation data can now be used to determine an input state, which can be used for producing the state model. A variable that is provided in the power supply network, for example in real time, as a measurement can be determined from the load flow simulation as the state variable, or a simulated value, as an input. The target is a relevant state variable, for example a voltage modulus, a current, which can be combined from the simulated data and thus from the state model.

The state model can, for example, be produced, or formed, by a neural network, in particular by a Bayesian neural network, wherein the load flow simulation, or the results of the load flow simulation, and thus the state variable can thus be used as training input for the Bayesian neural network (BNN).

In some embodiments, in response to the novel changes in power supply networks which are in the form of low-voltage networks, operating approaches can be implemented with the newly added systems, which are in particular energy generators or energy consumers, in order to control the consumers in a targeted manner in critical network situations, in order to avoid overloads. This can prevent, for example, the voltage band from being violated and/or fuses from being tripped as a result of the maximum power being exceeded. Such an operating approach can only be implemented if a state, or the states, of the power supply network are known, for example how close a voltage band overrun that needs to be avoided and/or a current limit are. Here, the method provides an option for determining such states and thus for operating the power supply network. In particular, weights or errors of the state model are available not only deterministically but also statistically. The state model can take into account an uncertainty and an indeterminacy using the probability distribution relating to the weights of the neural network, in particular the BNN.

In some embodiments, the state model is used to carry out a control intervention on one of the plurality of systems. In other words, the method determines at least one control intervention for one of the systems of the power supply network. In particular, the control intervention can be determined by the state model in such a way that, for example, a boundary condition characterizing the power supply network, for example, is not violated. The method thus allows operation of the power supply network, since at least one of the systems of the power supply network can be operated in response to a state of the power supply network due to the control intervention.

In some embodiments, the state model is determined by machine learning, for example by means of a neural network, in particular by means of a Bayesian neural network, wherein the at least one state variable obtained by the load flow simulation is used as training data. In other words, the state model is determined by machine learning or artificial intelligence methods, e.g. using a neural network, or an algorithm that can map the functions of a neural network. A Bayesian network, or Bayes network, can describe random variants and conditional dependencies between the random variables, wherein the distribution, or probability distribution, is often a normal distribution or at least is initiated by a normal distribution. In this way, the method can entail initializing a Bayesian neural network, which is at least offline at the beginning and thus does not receive any real-time data, for example. The Bayesian neural network, or BNN, is trained with the training data, which are obtained in particular by way of the load flow simulation. This results in the advantage that machine learning methods can be used to determine the state of the power supply network, this allowing, for example, a complicated assumption for producing the initial model, or a prior distribution, to be kept particularly simple.

In some embodiments, the state model is refined by repeating the load flow simulations, or the refinement is carried out as a result of the repetition, wherein the load flow simulation is repeated until a specified quality criterion is met as a termination condition. In other words, a training phase for training the state model is complete when the training data meet a certain quality criterion. Otherwise, the load flow simulation can generate further data, which can be used to achieve better accuracy.

In some embodiments, the system data are generated, or provided, by a smart meter and/or a field device and/or an active element, in particular at least one of the plurality of systems. In other words, when providing the system data, measurements and thus measurement results, or measurement data, are retrieved, or used, from a smart meter and/or a field device, which may be a circuit breaker comprising a feeder from a medium-voltage transformer and/or may be a local network station.

Depending on the type of measuring device provided in the field device, a different measured variable can be recorded. In some embodiments, the data are provided by an active element, which can in particular be a flexible system, for example in a household. The active element can in particular have a unique identification feature. The active element can be, for example, a charging station and/or a photovoltaic system, which can be reported to an operator, or the operator of the power supply network, via a smartphone application, for example, at the time of installation. The measured value can be, for example, a power setpoint and/or geographic coordinates.

In some embodiments, real-time data and/or near-real-time data are supplied to the state model and/or the system data comprise real-time data or near-real-time data. In other words, the state model—in particular the BNN—receives data in real time from measurements from the measuring devices installed in the power supply network, especially of the systems. With these measurements as input, the output from the state model, especially the BNN, is instantiated multiple times, for example. Expected values and uncertainties can be determined therefrom.

In some embodiments, the state model is re-trained, wherein measurements are used as the input state and/or the state variable. In other words, for example, if data for previously estimated state variables, or for an estimated input state and/or a state variable, become available retrospectively for a time interval, they can be combined as additional targets and/or the measurements obtained can be combined as input into a new training phase. The smart meter can regularly transmit data to the network operator by using meter data management, or MDM for short. For example, data can be transmitted every day and thus be available for the method, at least for follow-up, which can improve predictions of the state model.

In some embodiments, a correlation between the control intervention and a change of state is detected. In other words, the state predicted by the method is monitored and/or readjusted, in particular in real time. This means that a change of state, and thus a state change, can be detected, or measured, and/or calculated during or after a control intervention has taken place on one of the systems. Thus, a correlation between the control intervention and the state change can be modelled, which allows, for example, a Bayesian model instead of the Bayesian neural network to be used to identify statistical parameters for this correlation by way of control interventions. This could improve the state model.

In some embodiments, during the load flow simulation a target variable is determined from an input variable, which together are used as a training pair for the state model. In other words, the input and the target are determined, wherein the output variable, or the input, can be a variable that is available as a measurement in real time in the power supply network and for which the load flow simulation combines the simulated values. In the case of the target variable, or the target, relevant state variables, for example voltage moduli, currents and so on, can be combined from the simulated data. A training pair for the training phase of the state model can be specified.

In some embodiments, the input state and/or the state variable and/or the state is a voltage and/or a current and/or a voltage band and/or a power, or the input state comprises a voltage, a current, a voltage band and/or a power. In some embodiments, the state variable comprises the voltage, current, voltage band and/or power. In some embodiments, the state comprises the voltage, current, voltage band and/or the power. This results in the advantage that the parameters that are particularly relevant for operating the power supply network are determined and/or calculated by the method.

In some embodiments, at least one of the plurality of systems is in the form of a consumer device and/or a generator device and/or a feeder and/or a local network station and/or a circuit breaker. In other words, the system is a consumer device and thus, for example, a household that has electrical consumers, such as a charging station for an electric vehicle. In some embodiments, the system is a generator device, for example a photovoltaic system, a wind turbine and/or a generator driven by hydropower. In some embodiments, the system can be in the form of a field device and thus it can be, for example, a feeder from a medium-voltage network, for example a circuit breaker on a medium-voltage transformer. For example, the system can thus be in the form of a transformer station, which acts as a substation and uses a transformer to reduce the voltage. The power supply network, or the model for the power supply network, can integrate a particularly large number of systems that are actually present in the power supply network.

In some embodiments, a sample is prepared and/or a modelled, a posteriori probability distribution relating to the state is produced. In other words, the output provided can be the preparation of a sample, for example. In some embodiments, an implementation of the modelled, a posteriori probability distribution relating to the state is possible. The sample can, for example, be used to check the present state model. Information from the model can be taken into account.

Some embodiments include a computer program which can be loaded, for example, in a memory of the electronic computing device of a press and comprises program means for performing one or more of the methods described herein when the computer program is executed in the electronic computing device, or a control device. In this regard, advantages and embodiments of the methods can be regarded as advantages and embodiments of the computer programs, and vice versa.

Some embodiments include an electronically readable data carrier comprising electronically readable control information stored thereon, which comprises at least one computer program as presented above and is configured to perform one or more of the methods as presented herein when the data carrier is used in an electronic computing device. In this respect, advantages and embodiments of the data carrier can be regarded as advantages and embodiments of both the computer programs and the methods, and vice versa.

For use cases or use situations which may arise for the method and which are not explicitly described here, it may be provided that, according to the method, an error message and/or a request for input of user feedback is output and/or a default setting and/or a predetermined initial state is set.

FIG. 1 shows a schematic flow diagram for a method for operating a power supply network which comprises lines 16 and a plurality of systems 18 connected thereto, wherein a state of the power supply network is determined using the teachings herein.

In a first step S1 of the method, GIS data 10 comprising geographic location information relating to the power supply network are provided, wherein the GIS data 10 originate from, or were or are created by, a geographic information system.

In a second step S2, a branch model 12 of the lines 16 is produced on the basis of the GIS data 10, wherein a starting probability for connections between the lines and/or between the lines and the plurality of systems is determined.

In a third step S3, system data are provided which characterize at least one of the plurality of systems 18, for example by whether the system 18 is a consumer of electrical energy and/or can provide electrical energy.

In a fourth step S4, a prior model of the power supply network is produced by combining the branch model 12 with the system data, wherein a starting probability for the at least one system 18 is determined, wherein the starting probability in particular describes a state of the at least one system 18.

In a fifth step S5, an, in particular random, input state is generated which describes a possible state of the power supply network described by the prior model.

In a sixth step S6, a load flow simulation is carried out which calculates at least one state variable on the basis of the input state.

In a seventh step S7, a state model of the power supply network is determined on the basis of the at least one state variable.

In some embodiments, the state model is used to carry out a control intervention on at least one of the plurality of systems 18. At least one of the plurality of systems 18 may be a consumer device and/or a generator device and/or a feeder and/or a local network station and/or a circuit breaker.

The disclosed method can be used to determine a network state estimate as an estimate of the state of the power supply network, representing an electricity distribution for end consumers, in particular by means of machine learning methods, for example by way of a neural network and/or a Bayesian learning approach, wherein corresponding weights, or a weighting, for the probability distribution can be stochastic instead of deterministic.

In some embodiments, the geographic information system, or GIS system for short, can use satellite data and/or aerial photographs, for example, and thus has measurements available. The GIS system can use the photographs, for example, to determine a geographical location of start points and end points of the lines 16, and/or electrical data, such as resistance and reactance per unit length of the lines 16. Furthermore, the geographical location and electrical properties of the transformer station, which represent one of the systems 18, for example, can be recorded. In addition, a geographical location and/or characteristic data, for example annual consumption data, of connected end consumers or households can be available to the geographic information system. The geographical location and characteristic data, for example the installed line 16 and/or the orientation of photovoltaic systems, PV systems for short, can also be held by the geographic information system and retrieved therefrom. In addition, the geographical location and/or characteristic data of charging stations, such as a maximum charging power, can also be held.

In some embodiments, the system data can be provided, for example, by a smart meter 20 and/or a field device 24, which can in particular perform measurements, and/or an active element 22, advantageously in real time. For example, smart meters 20 can be installed at the end consumers, i.e. in particular in houses and/or flats which have systems 18. Such a smart meter 20 may have a unique designation, a smart meter ID. The smart meter 20 is used to take measurements of voltage moduli, in particular with quarter-hourly resolutions, which can be retrieved every day using meter data management, MDM for short, for a longer time interval and which, for example, can be made available to a central IT system. The IT system, which is located at the network operator's premises, for example, and/or which is designed to carry out the method, can be at least one electronic computing device.

In some embodiments, the smart meter 20 can provide the central IT system with measurements of drawn powers, likewise in particular at a quarter-hourly resolution, which can be retrieved every day using the MDM for a longer time interval.

Field devices 24 can be installed at various locations in the power supply network. Circuit breakers comprising feeders from medium-voltage transformers and/or local network stations, in particular transformers, which regulate medium voltage to low voltage are typical. Depending on the type of measuring device held at the field device 24, different measured variables can be recorded. The field device 24 may have a unique identifier, or ID, and be designed to measure electrical variables.

For example, power injected into the power supply network can be measured, which can be carried out with a resolution of one minute, for example. In some embodiments, a measurement of the injected reactive power is also possible with a resolution of one minute. In some embodiments, a measurement of currents flowing at each feeder can also be carried out at a resolution of one minute and/or a measurement of the voltage can also be carried out with a resolution of one minute. The data that provide this measurement can be used for the input state and/or to produce the prior model and/or as a state variable.

In some embodiments, the active element is a flexible system in one of the households or at an end consumer, wherein the flexible system can have a unique identification number, or ID. The flexible system can be a charging station and/or a photovoltaic system, PV system for short, which can be controlled, in particular by the control intervention described. When the flexible system is installed, a QR code can be photographed and stored in a smartphone application, for example, thus storing information about the flexible system and its coordinates and allowing said information to be made available to the electronic computing device.

In some embodiments, the active element or the flexible system can have measurements and/or control degrees of freedom available which can record a power setpoint, in particular at resolutions accurate to the minute, and/or comprise geographic coordinates.

In some embodiments, to determine the state of the power supply network and its probability distribution, a Bayesian neural network is used. In other words, the state model is determined by machine learning, in particular by means of the Bayesian neural network, wherein the at least one state variable obtained by the load flow simulation can be used as training data.

Figure 2:
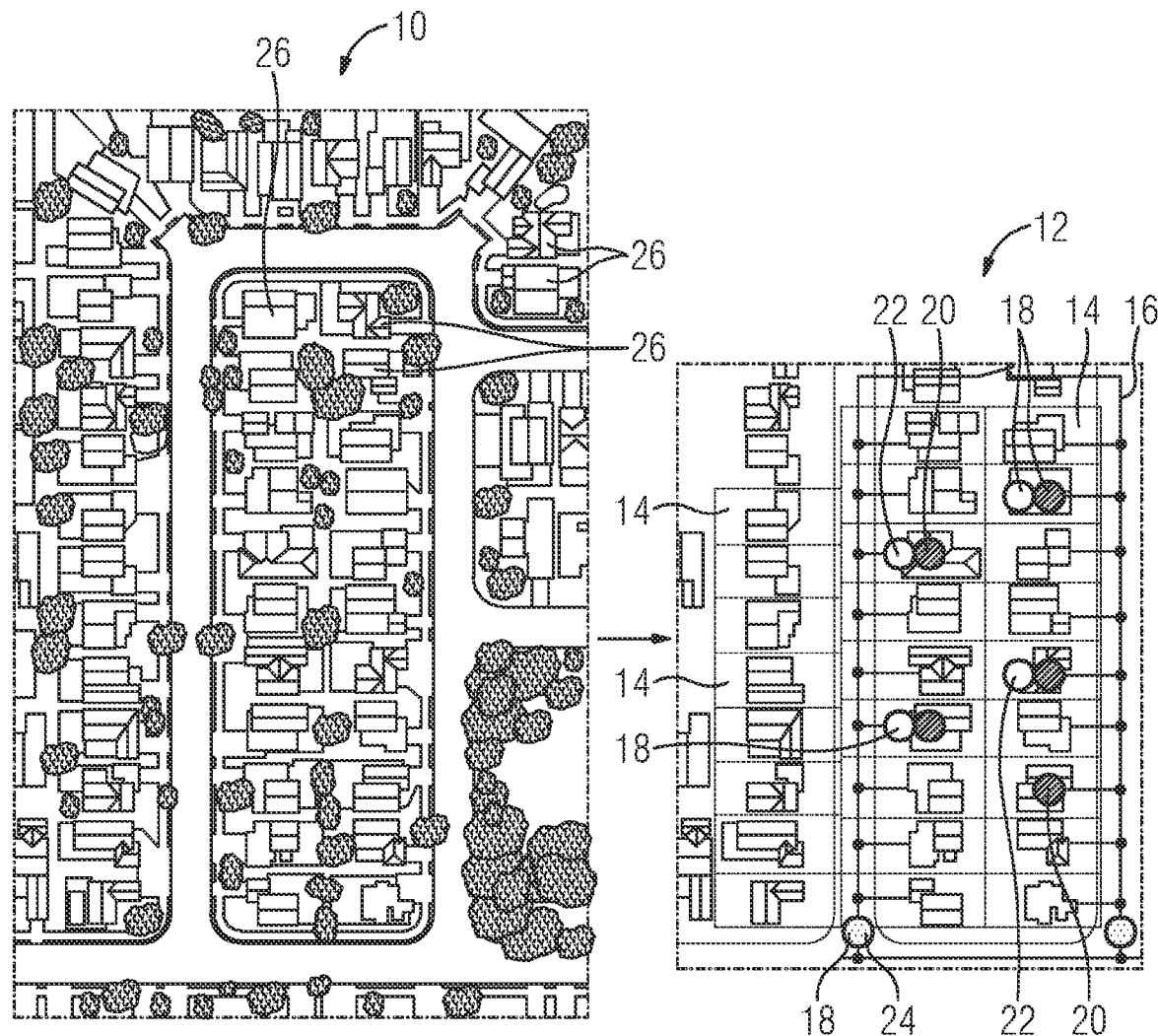
FIG. 2 shows a schematic sequence of a part of the method according to FIG. 1 in which a branch model is produced from GIS data.

Now, for example, a parameterization of a prior distribution can be carried out to determine the prior model, wherein the prior distribution can comprise simple basic assumptions. Using the GIS data 10, the branch model 12 can be created as outlined in FIG. 2. This branch model 12 shows the route of the lines 16 of the power supply network and in particular the route between the lines 16 and the systems 18. In this respect, the branch model 12 is reminiscent of a skeleton or framework of the power supply network, as shown in FIG. 2. When creating this model, the lines 16 and their connections from end points and/or geographically close starting points and thus topology states are recorded. In doing so, determining probabilities can be modelled, especially for the connections. These probabilities, or starting probabilities, can be chosen to be evenly distributed, for example, without additional prior knowledge.

In order to now be able to form the prior model, which is generated in step S4, a probability distribution, the starting probability, is created for the connected systems 18 from associated characteristic data, the system data. This probability distribution can, for example, describe possible load and/or feed states with specific uncertainties. If measurement data are available, the probability distributions can be obtained therefrom. In the load flow simulation, state variables in particular are simulated. This can involve samples being drawn according to the prior and/or parameterized probability distributions. That is, a set of topology states, loads and/or feeds is specified. These can be generated in particular randomly and form, for example and in particular, an input state of the power supply network.

In the load flow simulation, the simulation is now carried out with this input state, which is generated in particular at random, so that a state variable, which characterizes a state, such as voltage, current and/or line flow, is calculated. In some embodiments, during the load flow simulation a target variable is determined from an input variable, which together are used as a training pair for the state model. In other words, the input variable, a so-called input, or the input state, and the target variable, or a target, or an output from the model, are combined. The training pair formed therefrom can be provided for training, or for a training phase, of the state model, which is formed in particular from the Bayesian neural network.

The input state and/or the state variable and/or the state may in particular comprise a voltage and/or a current and/or a voltage band and/or a power. Thus, the input for data—the input state—of the load flow simulation, which is used for training the input pairs as the training data, or as the training pair, that results is a variable which is available as a measurement, in particular in real time. A particularly relevant state variable, such as a voltage modulus and/or current, which is combined from the simulated data values, is used or output as the target.

In some embodiments, the training, or the training phase, can be used to refine the state model, in particular after repeating the load flow simulation, wherein the simulation can be repeated until a quality criterion is met as a termination condition. In other words, in the training phase, the Bayesian neural network is initialized and trained with training data sets and the training is repeated with newly formed training data. If a quality criterion is met for one of the training data sets, the first training can be considered complete. Otherwise, in particular steps S4 and S5 of the method can be used to produce further training data, which allow a better accuracy for predictions of the state to be achieved for the state model. After training, the state model can use measurements as inputs during operation and the output from the BNN can be instantiated multiple times. Expected values and/or uncertainties can be determined therefrom.

In some embodiments, the state model can be supplied with data in real time, that is to say real-time data. In particular, the system data can be in the form of real-time data at least in part, and especially in the event of the method being carried out repeatedly. Thus, during ongoing operation of the power supply network, when new input states, or input variables, and thus inputs are constantly generated, in particular by measurements, effectively in real time, it can be operated in such a way that, for example, expected values and uncertainties are formed on the basis of the measurements.

In some embodiments, the state model can be re-trained, wherein measurements are used both as the input state and/or the state variable. In other words, data for an estimated state variable are available retrospectively from the MDM, for example; these are combined as additional targets and associated measurements relating to the same time interval as inputs into new training pairs. The BNN can be re-trained with these training pairs.

In some embodiments, a correlation between the control intervention and a change of state is detected during the method, or during operation of the power supply network. In other words, the system is explored to gain knowledge. For example, different optimum control interventions on the systems 18, in particular with active identification signals, which do not violate any boundary conditions of the state model, for example, can be determined. Furthermore, measurements of the day state variables and associated input measured variables can be recorded. Furthermore, a correlation between the control intervention and a state change can be modelled, wherein for example a Bayesian model instead of the Bayesian neural network can identify statistical parameters of the correlation through the control interventions.

FIG. 2 systematically shows the situation for the branch model, wherein GIS data 10 are available in the form of an aerial photograph in which, in particular, a plurality of houses 26 can be seen and which is analyzed, for example, using machine vision. The machine vision can be used to produce the branch model 12. Individual areas of the aerial photograph are divided into segments 14. A line 16 and/or a system 18 can now be identified in a respective segment 14. For example, the systems may be a smart meter 20 or an active element 22 or a field device 24.

In some embodiments, an uncertainty and/or an indeterminacy can be taken into account using a probability distribution relating to the weights of the Bayesian neural network. The methods can be used to operate a safety-critical application such as the power supply network.

LIST OF REFERENCE SIGNS

10 GIS data
12 Branch model
14 Segment
16 Line
18 System
20 Smart meter
22 Active element
24 Field device
26 House
S1 First step
S2 Second step
S3 Third step
S4 Fourth step
S5 Fifth step
S6 Sixth step
S7 Seventh step

The invention claimed is:

1. A method for operating a low-voltage and/or medium-voltage power supply network including lines and a plurality of systems connected thereto, the method comprising:
   providing GIS data with geographic location information relating to the power supply network, from a geographic information system;
   producing a first potential branch model of the lines on the basis of the GIS data using an evenly distributed starting probability for connections;
   providing system data characterizing at least one of the plurality of systems;
   producing a prior model of the power supply network by combining the branch model with the system data, including determining a starting probability for the at least one system;
   generating an input state describing a possible state of the power supply network described by the prior model;
   carrying out a load flow simulation calculating at least one state variable on the basis of the input state;
   determining a state model of the power supply network on the basis of the at least one state variable; and
   operating the power supply network based on the state model.

2. The method as claimed in claim 1, further comprising using the state model to carry out a control intervention on one of the plurality of systems.

3. The method as claimed in claim 2, further comprising detecting a correlation between the control intervention and changes of state.

4. The method as claimed in claim 1, wherein the state model is produced by machine learning, wherein the at least one state variable obtained by the load flow simulation is used as training data.

5. The method as claimed in claim 4, further comprising refining the state model by repeating the load flow simulations until a specified quality criterion is met as a termination condition.

6. The method as claimed in claim 1, further comprising receiving the system data from a smart meter and/or a field device and/or an active element.

7. The method as claimed in claim 1, further comprising receiving real-time data supplied to the state model and/or wherein the system data comprise real-time data and/or near-real-time data.

8. The method as claimed in claim 1, further comprising retraining the state model using measurements as the input state and/or the state variable.

9. The method as claimed in claim 1, further comprising determining a target variable during the load simulation from an input variable, and using them together as a training pair for the state model.

10. The method as claimed in claim 1, wherein the input state and/or the state variable and/or the state comprise a voltage and/or a current and/or a voltage band and/or a power.

11. The method as claimed in claim 1, wherein one of the plurality of systems comprises a consumer device and/or a generator device and/or a feeder and/or a local network station and/or a circuit breaker.

12. The method as claimed in claim 1, further comprising preparing a sample and/or a modelled, a posteriori probability distribution relating to the state.

13. A non-transitory electronically readable data carrier having electronically readable control information stored thereon, which comprises at least one computer program configured to, when the data carrier is used in an electronic computing device:
   provide GIS data with geographic location information relating to the power supply network, from a geographic information system;
   produce a branch model of the lines on the basis of the GIS data, including using an evenly distributed starting probability for connections;
   provide system data characterizing at least one of the plurality of systems;
   produce a prior model of the power supply network by combining the branch model with the system data, including determining a starting probability for the at least one system;
   generate an input state describing a possible state of the power supply network described by the prior model;
   carry out a load flow simulation calculating at least one state variable on the basis of the input state;
   determine a state model of the power supply network on the basis of the at least one state variable; and
   operate the power supply network based on the state model.

* * * * *